United States Patent [19]
Scott et al.

[11] 3,831,747
[45] Aug. 27, 1974

[54] FLUIDIZED BED PROCESSING OF CARBON BLACK

[75] Inventors: Oscar Thomas Scott; Bennie Smithers Setliff, both of Borger, Tex.

[73] Assignee: J. M. Huber Corporation, Locust, N.J.

[22] Filed: June 2, 1972

[21] Appl. No.: 259,212

[52] U.S. Cl. ............... 209/11, 209/138, 209/474, 34/10
[51] Int. Cl. .................. B03b 1/00, B03b 13/00
[58] Field of Search .......... 209/11, 466, 474, 3, 4, 209/138; 34/10, 57 R, 57 A, 57 C, 89; 209/139

[56] References Cited
UNITED STATES PATENTS

| | | | |
|---|---|---|---|
| 2,316,208 | 4/1943 | Woodruff | 34/89 X |
| 2,586,818 | 2/1952 | Harms | 34/10 X |
| 2,864,763 | 12/1958 | Schulman | 209/138 X |
| 3,186,102 | 6/1965 | Brociner | 34/10 |
| 3,282,577 | 11/1966 | Bottle | 34/57 R X |
| 3,333,692 | 8/1967 | Eveson | 209/474 |
| 3,630,353 | 12/1971 | Seidel | 209/11 |

FOREIGN PATENTS OR APPLICATIONS

| | | | |
|---|---|---|---|
| 380,196 | 9/1932 | Great Britain | 209/466 |
| 509,909 | 10/1937 | Great Britain | 34/10 |
| 530,222 | 9/1956 | Canada | 209/11 |

*Primary Examiner*—Robert Halper
*Attorney, Agent, or Firm*—Harold H. Flanders

[57] ABSTRACT

An improved manufacturing technique for simultaneously cooling and separating "fines" and/or contaminants from granular materials or powders such as carbon black is disclosed. The process includes the use of a fluidized bed to effect the removal of fines and foreign matter, the quenching of exothermic reactions and extinguishing of fires as they may exist and the continuous cooling of hot granular materials such as pelletized carbon black. Due to the high rate of heat transfer in the fluidized bed, very rapid cooling of the material is accomplished and in a manner such that, for example, cooled carbon black shows no tendency to spontaneously generate heat or to burn or begin or continue rapid oxidation while in bulk storage and/or transporting facilities. Through proper instrumentation of the fluidized bed, the presence of exothermic reactions, such as fires in the dryer as well as the presence of indothermic reactions, such as the presence of "wet" black can be simply and easily detected.

8 Claims, 1 Drawing Figure

PATENTED AUG 27 1974
3,831,747
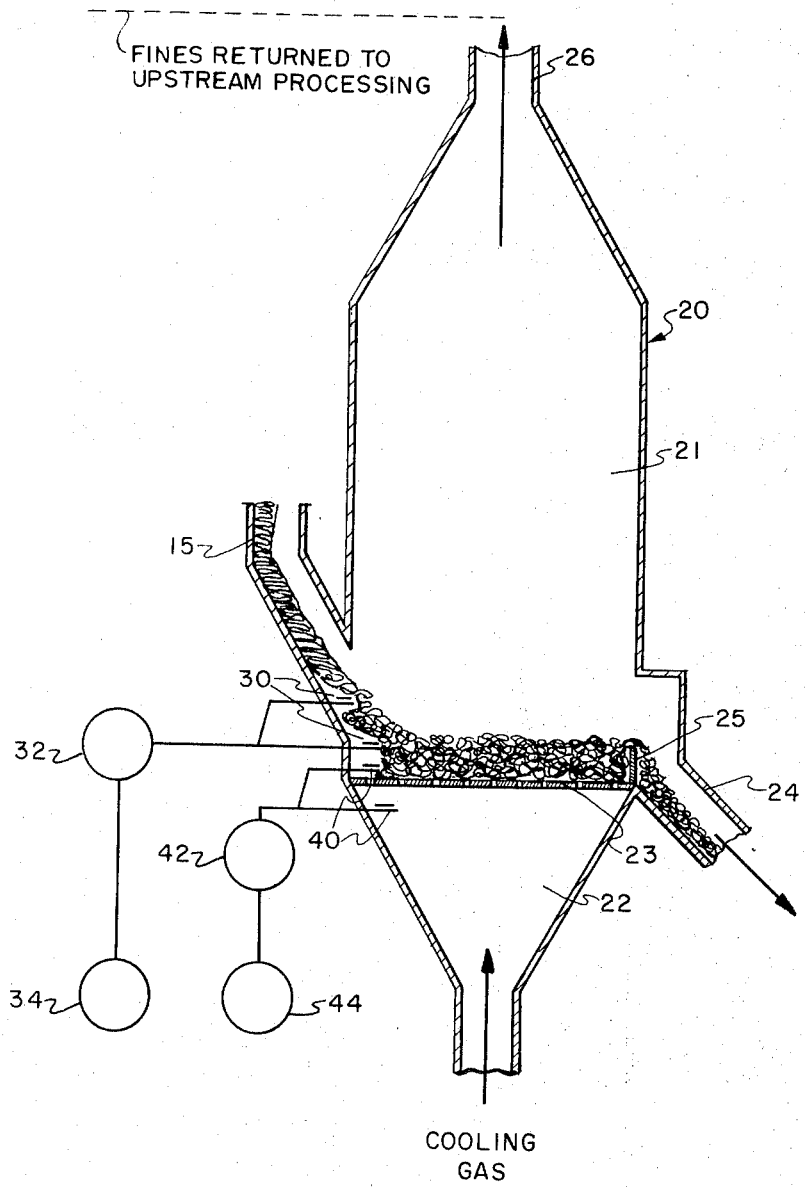

FLUIDIZED BED PROCESSING OF CARBON BLACK

BACKGROUND OF THE INVENTION

The present invention relates to the production of granular materials such as carbon black, and, more particularly, to the improved manufacturing technique for processing pelletized granular materials such as carbon black.

For example, as known in the art, carbon blacks may be produced by cracking and/or incomplete combustion of a hydrocarbon feedstock in an enclosed conversion zone at high temperatures. In such processes, it is conventional to pass the hot reactor gases through a quench chamber wherein the gases are sprayed with water or other quenching medium, and then to pass the quenched gases to a filtering zone wherein the carbon black is separated from the gases. Thereafter, to facilitate its handling and to decrease its volume, the black is pelletized and subsequently dryed.

As the product is dryed, it can reach temperatures near or occasionally above its ignition temperature before being conveyed to storage or finished stage handling facilities. For example, in carbon black processing, at the discharge end of the dryer, the product typically may reach temperatures of around 500° F and is "finished" insofar as its chemical composition is concerned. Downstream of the drying process the pellets are subjected to a variety of conveying mechanisms such as screw conveyors, bucklet elevators, and the like. To meet the specifications of the ultimate consumer, the product is, prior to shipping, segregated according to pellet size and screened of lumps and fines. In this regard, prior art techniques for attempting this segregation conventionally employ various screening apparatus such as rotating or vibrating screeners. The initial portion of such screeners is usually constructed of a very fine mesh screen with the following segments being made of successively larger mesh screens. The "fines" (i.e., that portion of the product stream considered too small for customer satisfaction) falls through the small mesh screens leaving only the final product and "overs" (i.e., that portion of the dryer discharge stream too large to satisfy customer specifications). The acceptably sized product or pellets are separated from the remaining stream in a similar manner and are typically then carried to bulk storage bins or hopper cars. The "fines" and "overs" can then be isolated for disposal or re-cycled to a point up-stream to be reprocessed, as for example, by pelletizers and dryers.

Depending upon the particular equipment employed, it has often been found that a high proportion of the product discharged by the dryer may be returned to be reprocessed in the form of fines and overs. Experience has also shown that fines present a more difficult separation problem than overs since the small mesh screen used to separate the fines from the production stream is easily plugged and, as a result, it is difficult to keep open and properly functioning. Because of this occasional plugging, a substantial portion of the fines can end up with the finished product.

In addition, when the process stream from the dryers in a carbon black production process, for example, is routed directly into either the bulk storage bins or waiting hopper cars, problems frequently arise in areas other than excessive fines; namely, the tendency for the static carbon black to over heat and/or begin oxidation or an exothermic reaction and catch on fire even though it is below its lower ignition temperature.

While prior art workers have suggested various approaches to this problem, such as allowing sufficient time for the material to be cooled by the conductive-convective "heat sink" effect of the conveyors or even by direct spraying of water or quenching materials directly onto the black discharging from the dryers, none has proved to be commercially acceptable.

SUMMARY OF THE INVENTION

In summary, the present invention relates to processing of pelletized granular materials, such as carbon blacks, and, more particularly, to the production of a "clean" and a "cool" product suitable for bulk storage and shipping. As defined herein a clean product is one which contains little or no foreign material and an acceptable or desirable percentage of fines. A clean product is also one which attrites very little during normal handling and conveying processes. Foreign matter usually consists of metal (both ferrous and non-ferrous types) introduced into the production stream due to mechanical failures and/or the wear and tear of process equipment. It may also be any material appreciably different in either size or density from the produced material. A cool product is one which has a temperature low enough to prevent heat damage to bulk storage and/or shipping equipment and also has little or no tendency to spontaneously generate heat while stored as a large static mass.

In its broadest aspect, the invention is based on the unexpected discovery that a fluidized bed system, as disclosed in detail hereinafter, can solve the cleaning and the cooling foreign material segregation, and exothermic/indothermic reaction detection, processes simultaneously. In accordance with the invention, ambient air or any suitable low temperature gas is employed as the fluidizing and cooling medium. The gas also separates, and conveys from the bed, the "fines" of the production stream. Due to the high rate of the heat and mass transfer characteristics of fluidized beds, very rapid cooling of the pelletized material such as carbon black is accomplished without significant attrition.

Thus, there is provided, in accordance with the present invention, a highly economical and improved technique for cooling, classifying and/or sizing granular material, such as pelletized carbon black, segregating foreign materials, and detecting indo/exothermic reactions, that is not subject to disadvantages of prior known systems, e.g., the plugging of screeners, the use of magnetic separating devices for the removal of metal contaminants, etc.

It is, accordingly, a general object of the present invention to provide a process for simultaneously cooling and cleaning granular materials, such as carbon black.

Another and more particular object is to provide an improved process for sizing and rapidly cooling and/or quenching granular materials, such as pelletized carbon black.

Another object is to provide a novel processing technique for quenching any fires produced by the over-heating of a production stream within a carbon black drying apparatus.

Yet another object is to provide a carbon black processing system wherein pelletized granular materials such as carbon blacks are sized and polished.

Yet still another object is to provide a novel technique for cooling hot carbon black in a manner such that the black shows no tendency to generate heat spontaneously or to cause fires in bulk storage and transporting facilities.

Another object of the present invention is to provide a novel technique for detecting indothermic reactions such as those involving the latent heat of vaporization of any vaporizing substance associated with granular material such as water used to pelletize carbon blacks.

A further object is to provide a system for detecting fires or the presence of "wet" carbon black produced as a result of equipment malfunction or operator error in the carbon black process.

The manner in which the foregoing and other objects are achieved in accordance with the present invention will be better understood in view of the following detailed description and accompanying drawing, which forms a part of this specification and wherein;

The FIGURE is a diagrammatic illustration, shown in elevation, of a suitable arrangement of apparatus for carrying out a particularly advantageous method embodiment of the invention.

DESCRIPTION OF THE PREFERRED EMBODIMENTS

The improved process of the present invention relates to the use of a fluidized bed to effect the simultaneously removal of fines and foreign matter as previously described, the extinguishing of fires as they may exist, and the cooling of granular materials, such as carbon black. In this regard and with reference to FIG. 1, the heated granular material such as dried carbon black pellets, which may have a temperature on the order of about 300°–400° F are transferred by way of a conduit 15 from a dryer (not shown) into a substantially vertical, elongated cylindrical fluidized bed apparatus indicated generally at 20. As shown, the cylindrical vessel 20 is divided into an upper fluidized bed or cooling zone 21 and a lower gas distribution zone 22 by way of a perforated distributor plate 23.

The fluidizing gas, e.g., ambient air, passes upwardly through the distribution plate and into the fluidizing or cooling zone 21 at a velocity such that a dense fluidized bed of carbon black pellets is maintained therein.

After being held for brief periods within the fluid bed the granules are cooled and "polished" which results in a more durable and easier to handle product. In the practice of the invention it has been found that almost any degree of cooling can be accomplished without degrading the product. Generally speaking, the amount of cooling or final temperatures of the granules is limited only by the temperature of the air or gas used as the fluidizing medium. A temperature drop of from about 100°–150° F, in the case of carbon black, has, in general, been found to be satisfactory for achieving the objects of the invention. Also, when employed on hot carbon black because of the rapid cooling action of the bed, any tendency for the carbon black granules to begin or continue oxidation is offset thus effectively "air quenching" any fires or other exothermic reactions produced by overheating of the production stream within the dryer. Polishing consists of the removal of sharp edges or protuberances from the individual pellets or granules that are normally loosened or broken off during handling. The chips thus removed become fines. The cooled pellets or granules of the desired size, are then continuously or intermittently withdrawn through an outlet which can be in the form of a gravity stand pipe 24 that attaches flush with or extends into the fluidized bed. If desired, the standpipe 24 can be designed so it can be adjusted vertically in order to control the level of the bed, indicated generally at 25. In general, the carbon black pellets or other material should be withdrawn from the fluidized bed at a point laterally remote from that at which the hot materials or pellets are introduced.

Any material substantially larger or more dense than the normal range of size and density of the produced material such as carbon black pellets (withdrawn via conduit 24) is separated by gravity from the main portion of the fluidized bed and is detained in the bottom thereof. If such objectional material does not become too great a percentage of the volume of the bed, it has been found to have little or no effect upon the efficiency of the system. However, a vertical standpipe (not shown) having its upper end near the bottom of the bed may be employed for removing this material. As stated above, magnetic separators are normally used to remove all ferrous material from granular material (such as carbon black) production streams. However, since much of the foreign material is non-ferrous, such contaminants cannot be removed with a magnet. In accordance with the present invention, the fluid bed cooler will separate both ferrous and non-ferrous metals, as well as other matter (e.g., refractory and ceramic particles) appreciably larger and/or more dense than the produced granular material such as carbon black pellets.

The fines are conveyed and separated from the fluidized bed and may be withdrawn from the upper portion of the apparatus 20 through a suitable conduit 26. After being removed, the fines are passed to a collection system where they are collected by way of conventional equipment, such as cyclone separators, mist precipitation devices, etc.

In accordance with the present invention, it has been found that proper sizing of the bed gives highly precise control over the size of the particles returned as fines. By adjusting the free space fluidizing gas velocities upward and downward, the size and amount of the fines can be increased or decreased accordingly. This characteristic eliminates the need for the more costly and elaborate "fines" removal screeners etc. such as discussed above. While "fines" are normally considered as any relatively small material, as used herein the term is intended to include any preselected size or "cut" which may be desired to be removed as "fines" from the fluidized bed. In other words, the versatility of the fluidized bed separator of the invention permits the separation of essentially all particles below a given or predetermined size.

In addition to the separation or removal of fines and the cooling of the hot blacks, by the present invention it is possible to detect exothermic reactions and fires which may exist and through suitable instrumentation (such as a temperature measuring means) transmit an electrical or other suitable signal to actuate a warning light and/or alarm or to actuate control valves, etc. for regulating the feed supply to, or temperature of, a dryer or other upstream heat source. This is significant in that if, for example, a fire is not extinguished because of a malfunction by the cooling air or gas in the fluidized bed, it allows time for proper remedial action (manually or by instruments) before the fire is allowed to reach the bulk storage shipping facilities. In addition, the material may occasionally be produced "wet." "Wet" meaning containing an unacceptably high percentage of moisture. Again, through proper instrumentation such as the temperature measuring means (which indicate and/or record the fluidizing air or gas temperature and the temperature of the fluidized bed of material such as carbon black) the presence of "wet" material can be detected, allowing preventative measures to be taken to keep from contaminating, e.g., a bulk storage tank with the wet product.

As will be readily appreciated by those skilled in the art, the design of the fluidized bed, as well as the operating parameters can be readily calculated from energy balance equations published in standard texts on the subject (e.g., Vanecek et al, *Fluidized Bed Drying*, Leonard Hill Books, London, 1966) or may be determined from routine experimentations. It has been found in the application to carbon blacks that free space conveying velocities within the cooler or fluidized bed in the range of from about 90 to 180 feet per minute will give the "cut" desired for most grades of pelletized black. Based on a bed having a 4 foot diameter, an air or gas flow rate of about 1,000 – 1,400 cfm at 75° F results in a temperature drop of about 100° to 150° F in carbon black entering the system at approximately 350° F. A larger bed would require more cooling air or gas but would also result in a larger decrease in black temperature. Other materials and cooler configurations would result in different optimum processing conditions which may be determined by routine experimentation.

The actual diameter of the bed is determined from the allowed air flow rate, the temperature of the bed (or actually of the air leaving the bed) and the maximum allowable superficial space velocity of the air within the bed of pellets. Since the elutriating action of the fluid bed is, up to a point, a beneficial effect, and is largely influenced by air rates the maximum allowable superficial space velocity is that ACFM velocity immediately above the active bed above which those particles and pellets "air veyed" or carried from the bed by the cooling medium are considered too large to be returned as fines. This velocity may be predicted from a theoretical approach; however, it is best determined experimentally. As discussed above superficial space velocities in the range of from 90 – 180 fpm have been found to produce an acceptable elutriation or "fines" removal rate for most carbon black fluid bed cooler configurations. With this velocity and the limiting volumetric flow rate of exhaust gases from the bed, the required bed area can be found. How this area is physically shaped has little to do with the effectiveness of the device. In other words, if a rectangular, as opposed to a cylindrical bed, would be more convenient for installation purposes, there appears no reason not to construct the bed in a rectangular configuration.

Tests on carbon black have established that the percent open area of the diffuser plate should preferably be approximately 1.0 to 3.0%.

Above some minimum bed depths, the efficiency of heat exchange remains unchanged and closely approaches the maximum possible theoretical exchange. For all expanded bed depths above a minimum height, such as 4 inches, the temperature of the air leaving the bed is, within the degree of accuracy of thermocouples, identical to that of the bed itself. Hence, the lower limit of bed depth is set by other design considerations such as allowable pressure drop, elutriation, etc.

While processing a production stream of about 120,000/day with 1,000 cfm of 75° F air, the cooler effected an average drop in black temperature of 135° F (from 348° F inlet to 213° F outlet). This compares quite well with the theoretically predicted value of 134° F as derived from the theoretical and standard design equations. The maximum deviation from theory experienced was less than 4 percent.

In addition to the equipment performing as expected, it was found that after being cooled by the fluid bed the pellets had no tendency to spontaneously increase in temperature.

Further consideration in the design of the fluid bed cooler was the degree of "fines" removal or elutriation possible and how this effect varied with bed depth and fluidizing air flow rates. It was found that as the bed depth decreased the amount of elutriation increased. Likewise, it was found that as the fluidizing air flow rate was increased, the fines removed increased sharply in amount.

Tests were conducted with carbon black ignited at 900°F simulating a production stream containing about 20 percent burning black. Immediately after the beginning of the burning black addition to the fluid bed cooler, a slight (3° – 5° F) rise in exhaust air temperature was detected. The bed temperature remained constant and apparently unaffected by the burning black. About 5 seconds after the burning black addition ended, the exhaust air temperature dropped back to its previous level and continued there at a constant value.

It was found in these tests that in each case the ignited pellets remained intact, but were completely extinguished by the fluid bed cooler. The bed temperature showed no significant tendency to increase during the tests and instead, actually decreased about 20° F.

A number of tests were conducted on the fluid bed carbon black cooler to determine possible pellet degration.

It was found that, in general, and certainly within the accuracy of the tests performed, there was no destruction of pellets or decrease in bulk pellet quality.

The average inlet mass pellet strength over 10 separate tests on GPF black was 56.28 compared to an average outlet mass pellet strength as measured by the standard Western Electric test of 55.65. The pour density was essentially unchanged on these same samples — a slight increase from $27.59/ft^3$ to $27.71/ft^3$.

Thermocouples 30 and 40 may be positioned in the system generally as illustrated in FIG. 1 and are connected in a subtractive fashion so as to indicate the difference in temperature between 1) the incoming and outgoing cooling gas (by thermocouples 40) to detect "wet" material and 2) the incoming and outgoing black temperature (by thermocouples 30) to detect "burning" material.

With steady state operating conditions (i.e., black and air temperatures and flow rates constant) "wet" black can be detected by the difference signal produced by thermocouples 40 being fed to alarm set circuits 42 and alarm indicator or control circuits 44.

Also under steady state operating conditions "burning" black can be detected by the difference signal produced by fire detection thermocouples 30 which may be fed to alarm set circuits 32 and alarm indicator or control circuits 34.

Using well known design equations for the inlet air and black conditions (or via experimentation) the "normal" amount of cooling that can be expected can be determined. For example the air temperature may "normally" increase 138° F, i.e., from an inlet temperature of 75° F to an outlet temperature of 213° F. If the "hot black" contains 1 percent moisture by weight and if that moisture or some fraction of it is evaporated in the bed than the air temperature will not increase 138° F as it goes through the bed but will only increase about 93° F as measured by thermocouples 40 due to the vaporizing water absorbing more heat than the air by itself could. With this being the case, then, if the differential temperature alarm set point at 42 has been set at 138° F then when the temperature difference begins to drop toward the 93° F level an alarm may be activated by 44 and the 1 percent moisture detected.

In a similar fashion, "burning" black can be detected via differential thermometery. For example under typical steady state conditions (i.e., without "fire") the black temperature as measured by thermocouples 30 may decrease 135° F i.e., from an inlet temperature of 348° F to a product outlet temperature of 213° F. If a fire is present than the heat of reaction from the fire will not let this amount of cooling take place. By setting the "fire" alarm set point at 32 at 135° F, it may activate a "fire" indicator circuit at 34 if at least 135° F of cooling is not achieved, thus detecting "burning" black.

From the above it will be seen that the present invention provides an unique manufacturing system for cooling hot carbon blacks while simultaneously separating fines and removing contaminants. Through proper instrumentation, the presence of fires as well as the presence of "wet" black can be detected. From the apparatus standpoint there are no moving parts and the size, weight and shape thereof can be altered as desired for convenience in locating it into existing structure and systems. In addition, the initial cost and cost of operation are less than that associated with conventional equipment now employed by the industry. While specific embodiments and examples have been disclosed for illustrative purposes, it should be apparent to those in the art that various modifications can be made without departing from the scope of the invention. For example, the fluid bed cooler can be applied to all grades or types of carbon black. Gases, other than air, such as nitrogen, etc. may also be employed.

What is claimed is:

1. A method for cooling and separating fines and contaminants from hot pelletized particulates of carbon black, said method comprising the steps of introducing hot, dried pelletized particulates of carbon black into an unobstructed cooling zone divided from an air distribution zone by a perforated distributor plate, and countercurrently to cooling air at ambient temperatures; continuously supplying through said distribution plate an upward stream of cooling air for maintaining said hot carbon black as a fluidized bed and to effect cooling of the said hot carbon black to a temperature below 300° F, and in the range of from 100°–150°F below that temperature at which said pellets were introduced into said cooling zone; maintaining the space velocity of said upward stream of the cooling air at a rate so as to air convey and sweep from said fluidized bed, fines of said carbon black below a preselected size; and withdrawing cooled carbon black from said fluidized bed.

2. The method in accordance with claim 1 wherein said cooling air is introduced into said bed at a temperature less than about 85° F and said cooled carbon black pellets are withdrawn at a temperature of less than 250° F, said method further comprising withdrawing and collecting the fines swept from said fluidized bed and returning said fines to a point upstream of said cooling zone for further processing thereof.

3. The method in accordance with claim 1 and further comprising collecting said contaminants, including ferrous and non-ferrous foreign matter, in the lower portion of said cooling zone and withdrawing said contaminants from said zone.

4. The method in accordance with claim 1 wherein said hot carbon black is introduced into said zone at an upper level thereof and at a point remote from that at which said cooled black is withdrawn.

5. The method in accordance with claim 1, said method further comprising measuring the inlet temperature of said cooling gas and the temperature of the fluidized bed of pelletized carbon black or freeboard gas above the upper level of said bed to thereby determine the moisture content of the hot pelletized carbon black being introduced into said cooling zone.

6. The method in accordance with claim 5 wherein said temperature measurement of said fluidized bed of pelletized carbon black or said gas above the upper level of said bed, is in operative association with an alarm that is caused to be actuated when said temperature difference is below a preselected level.

7. The method in accordance with claim 1, said method further comprising measuring the inlet temperature of said hot pelletized carbon black and the outlet or bed temperature of said granular material to thereby determine the presence of exothermic reactions.

8. The method in accordance with claim 7 wherein said temperature measurements produce a difference signal which in operative association with an alarm set circuit causes an indicator or control circuit to be actuated when said temperature difference is above a preselected level.

* * * * *